United States Patent
Karczewicz et al.

(10) Patent No.: US 9,826,238 B2
(45) Date of Patent: Nov. 21, 2017

(54) SIGNALING SYNTAX ELEMENTS FOR TRANSFORM COEFFICIENTS FOR SUB-SETS OF A LEAF-LEVEL CODING UNIT

(75) Inventors: Marta Karczewicz, San Diego, CA (US); Xianglin Wang, San Diego, CA (US); Liwei Guo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 1082 days.

(21) Appl. No.: 13/413,475

(22) Filed: Mar. 6, 2012

(65) Prior Publication Data
US 2013/0003821 A1   Jan. 3, 2013

Related U.S. Application Data

(60) Provisional application No. 61/503,541, filed on Jun. 30, 2011, provisional application No. 61/552,341, filed on Oct. 27, 2011.

(51) Int. Cl.
| | |
|---|---|
| *H04N 19/14* | (2014.01) |
| *H04N 19/70* | (2014.01) |
| *H04N 19/46* | (2014.01) |
| *H04N 19/129* | (2014.01) |
| *H04N 19/61* | (2014.01) |
| *H04N 19/132* | (2014.01) |

(52) U.S. Cl.
CPC .......... *H04N 19/14* (2014.11); *H04N 19/129* (2014.11); *H04N 19/132* (2014.11); *H04N 19/46* (2014.11); *H04N 19/61* (2014.11); *H04N 19/70* (2014.11)

(58) Field of Classification Search
None
See application file for complete search history.

(56) References Cited

U.S. PATENT DOCUMENTS

2006/0104361 A1   5/2006  Suzuki
2006/0273939 A1   12/2006 Tanaka et al.
(Continued)

FOREIGN PATENT DOCUMENTS

| EP | 1768415 A1 | 3/2007 |
|---|---|---|
| RU | 2335845 C2 | 10/2008 |

(Continued)

OTHER PUBLICATIONS

Davies, "Unified scan processing for high efficiency coefficient coding," JCTVC-D219, Jan. 20-28, 2011.*
(Continued)

*Primary Examiner* — William C Vaughn, Jr.
*Assistant Examiner* — Michael J Hess

(57) ABSTRACT

This disclosure describes techniques for coding transform coefficients for a block of video data. According to these techniques, a video encoder divides a leaf-level unit of video data into a plurality of transform coefficient sub-sets. The video encoder generates, for a sub-set of the plurality of transform coefficient sub-sets, a syntax element that indicates whether or not the sub-set includes any non-zero coefficients. In some examples, the video encoder may selectively determine whether to generate the syntax element for each sub-set. A decoder may read an entropy encoded bit stream that includes the syntax element, and determine whether to decode the sub-set based on the syntax element.

46 Claims, 8 Drawing Sheets

(56) References Cited

U.S. PATENT DOCUMENTS

| | | | |
|---|---|---|---|
| 2008/0089424 A1* | 4/2008 | Karczewicz et al. | 375/240.23 |
| 2008/0240246 A1 | 10/2008 | Lee et al. | |
| 2008/0304572 A1 | 12/2008 | Murakami et al. | |
| 2009/0028239 A1 | 1/2009 | Schuur et al. | |
| 2009/0074057 A1 | 3/2009 | Marpe et al. | |
| 2010/0086030 A1* | 4/2010 | Chen et al. | 375/240.12 |
| 2011/0080946 A1* | 4/2011 | Li et al. | 375/240.03 |
| 2011/0096834 A1 | 4/2011 | Cheon et al. | |
| 2012/0262313 A1* | 10/2012 | He et al. | 341/87 |

FOREIGN PATENT DOCUMENTS

| | | |
|---|---|---|
| TW | I253868 | 4/2006 |
| TW | I329464 | 8/2010 |
| TW | I331322 | 10/2010 |
| WO | 03084076 A1 | 10/2003 |
| WO | 2006118288 A1 | 11/2006 |
| WO | 2008086197 A1 | 7/2008 |
| WO | 20100014759 A1 | 2/2010 |
| WO | 2011053020 A2 | 5/2011 |

OTHER PUBLICATIONS

Karczewicz M et al., "Modifications to Intra Blocks Coefficient Coding with VLC", 97, MPEG Meeting; Jul. 18, 2011-Jul. 22, 2011; Torino; (Motion Picture Expert Group or ISO/IEC JTC1/SC29/WG11), No. m21046, Jul. 15, 2011 (Jul. 15, 2011), XP030049609, 6 pp.

Second Written Opinion from international application No. PCT/US2012/044990, dated Aug. 1, 2013, 11 pp.

International Preliminary Report on Patentability from international application No. PCT/US2012/044990, dated Oct. 30, 2013, 44 pp.

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011,193 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

International Search Report and Written Opinion—PCT/US2012/044990—ISA/EPO—dated Sep. 12, 2012, 15 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Kerofsky et al., "A 4×4 CBP in 1-56 H26L," Document VCEG-L22, 12th Meeting: Eisbee, Germany, Jan. 9-12, 2001, 5 pp.

Wien, "H.26L Core Experiment Description on Adaptive Block Transforms," Document VCEG-L41, 12th Meeting: Eisbee, Germany, Jan. 9-12, 2011, 5 pp.

Wiegand, "Editor's Proposed Changes Relative to JVT-E146d37ncm, revision 2," Document JVT-F082r2, 6th Meeting: Awaji Island, Japan, Dec. 5-13, 2002, 246 pp. Uploaded in Three Parts.

Bross et al., "High efficiency video coding (HEVC) text specification draft 6," 7th Meeting: Geneva, CH, Nov. 21-30, 2011, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "High efficiency video coding (HEVC) text specification draft 10 (For FDIS & Last Call)," 10th Meeting: Geneva, CH, Jan. 14-23, 2013, JCTVC-L1003_v34, 310 pp.

Reply to Written Opinion dated Sep. 12, 2012, from international application No. PCT/US2012/044990, faxed Mar. 7, 2013, 35 pp.

Han et al., "Improved Video Compression Efficiency Through Flexible Unit Representation and Corresponding Extension of Coding Tools," IEEE Transactions on Circuits and Systems for Video Technology, vol. 20 , No. 12, Dec. 2010, pp. 1709-1720.

International Telecommunication Union, "ITU-T H.264, Series H: Audiovisual and Multimedia Systems, Infrastructure of audiovisual services—Coding of moving video, Advanced video coding for generic audiovisual services," Mar. 2010, 669 pp.

Nguyen et al., "Improved context modeling for coding quantized transform coefficients in video compression," 28th Picture Coding Symposium, PCS2010, Dec. 8-10, 2010, Nagoya, Japan, pp. 378-381.

"Test Model under Consideration," Joint Collaborative Team on Video Coding (JCT-VC) of ITU-T SG16 WP3 and ISO/IEC JTC1/SC291WG11, Document: JCTVC-B205, Status: Output Document (draft000), Jul. 2010, Internet<URL:http://phenix.int-evry.fr/jct/doc_end_user/documents/20_Geneva/wg11/JCTVC-B205.zip>, 152 pp.

Winken, et al., "Description of video coding technology proposal by Fraunhofer HHI", JCT-VC Meeting, Dresden, DE, Apr. 15 through 23, 2010; (Joint Collaborative Team on Video Coding (JCT-VC) of ITU-T SG16 WP3 and ISO/IEC JTC1/SC29/WG11); Document: JCTVC-A116, 44 pp.

Sole et al., "Unified scans for the significance map and coefficient level coding in high coding efficiency", JCT-VC Meeting, Geneva, CH, Mar. 16 through 23, 2011; (Joint Collaborative Team on Video Coding (JCT-VC) of ITU-T SG16 WP3 and ISO/IEC JTC1/SC29/WG11); Document: JCTVC-E335, 5 pp.

Karczewicz et al., "Modifications to intra blocks coefficient coding with VLC", JCT-VC Meeting, Torino, IT, Jul. 14 through 22, 2011; (Joint Collaborative Team on Video Coding (JCT-VC) of ITU-T SG16 WP3 and ISO/IEC JTC1/SC291/WG11); Document: JCTVC-F612, 6 pp.

Karczewicz et al., "CE5: Sub-block coding of transform coefficients with CAVLC", JCT-VC Meeting, Geneva, Nov. 21, 30, 2011; (Joint Collaborative Team on Video Coding (JCT-VC) of ITU-T SG16 WP3 and ISO/IEC JTC1/SC29/WG11); Document: JCTVC-G674, 5 pp.

* cited by examiner

SIGNALING SYNTAX ELEMENTS FOR TRANSFORM COEFFICIENTS FOR SUB-SETS OF A LEAF-LEVEL CODING UNIT

This application is claims the benefit of U.S. Provisional Application Ser. No. 61/503,541, filed Jun. 30, 2011, and U.S. Provisional Application Ser. No. 61/552,341, filed Oct. 27, 2011, the entire contents each of which are incorporated herein by reference.

TECHNICAL FIELD

This disclosure relates to video coding and compression. More specifically, this disclosure is directed to techniques for scanning quantized transform coefficients.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In video coding, to compress an amount of data used to represent video data, a video encoder may entropy encode the video data. According the techniques described herein, as part of entropy encoding, a video encoder divides a leaf-level unit of video data into a plurality of transform coefficient sub-sets. A leaf-level unit as described herein refers to an unsplit unit of video data structure, one example of which is a final, unsplit child node of a quadtree data structure, as described in further detail below.

For at least one of the sub-sets, the encoder generates a syntax element that indicates whether the sub-set includes any non-zero coefficients as part of an entropy encoded bit stream. The encoder determines whether of not to signal the syntax element for a sub-set of the plurality of transform coefficient sub-sets. For example, the encoder may determine whether or not to signal the syntax element based on a number of potential non-zero coefficients within the sub-set, or based on an average number of non-zero coefficients for the sub-set based on statistics for one or more previously coded leaf-level units of video data.

A decoder may read an entropy encoded bit stream, and determine whether or not to decode transform coefficients of the sub-set based on the syntax element. In some examples, the decoder may determine whether or not to decode a sub-set of transform coefficients based on whether or not the entropy encoded bit stream includes a syntax element associated with the sub-set. For example, if the sub-set does not include an associated syntax element, the decoder decodes the sub-set. However, if the sub-set does include an associated syntax element, the decoder determines whether or not to decode the sub-set based on a value of the syntax element. For example, if the syntax element has a first value, the decoder decodes the sub-set, but if the syntax element has a second, different value, the decoder does not decode the sub-set.

In some examples, the techniques of this disclosure may improve coding efficiency of an encoder or decoder. For example, the techniques described herein may reduce a number of bits used by an encoder to generate an entropy encoded bit stream that represents video data.

In one example, a method of encoding a unit of video data comprises dividing a leaf-level unit of video data into a plurality of transform coefficient sub-sets, and generating, for a sub-set of the plurality of transform coefficient sub-sets, a syntax element that indicates whether or not the sub-set includes any non-zero coefficients.

In another example, a device may be configured to encode at least one leaf-level unit of video data. The device may comprise a processor configured to divide a leaf-level unit of video data into a plurality of transform coefficient sub-sets, and generate, for a sub-set of the plurality of transform coefficient sub-sets, a syntax element that indicates whether or not the sub-set includes any non-zero coefficients.

In another example, a device may be configured to encode at least one leaf-level unit of video data, the device comprising means for dividing a leaf-level unit of video data into a plurality of transform coefficient sub-sets, and means for generating, for a sub-set of the plurality of transform coefficient sub-sets, a syntax element that indicates whether or not the sub-set includes any non-zero coefficients.

In another example, a method of decoding a unit of video data comprises dividing a leaf-level unit of video data into a plurality of transform coefficient sub-sets, determining, for a sub-set of the plurality of transform coefficient sub-sets, whether the sub-set includes an associated syntax element that indicates whether or not the sub-set includes any non-zero coefficients, determining, based on the syntax element, whether or not to decode the sub-set.

In another example, a device may be configured to decode a unit of video data, the device comprising a processor configured to divide a leaf-level unit of video data into a plurality of transform coefficient sub-sets, determine, for a sub-set of the plurality of transform coefficient sub-sets, whether the sub-set includes an associated syntax element that indicates whether or not the sub-set includes any non-zero coefficients, and determine, based on the syntax element, whether or not to decode the sub-set.

In another example, a device may be configured to decode a unit of video data, the device comprising means for dividing a leaf-level unit of video data into a plurality of transform coefficient sub-sets, means for determining, a sub-set of the plurality of transform coefficient sub-sets, whether the sub-set includes a syntax element that indicates whether or not the sub-set includes any non-zero coefficients, and means for determining, based on the syntax element, whether or not to decode the sub-set.

The techniques described in this disclosure may be implemented in hardware, software, firmware, or any combination thereof. For example, various techniques may be implemented or executed by one or more processors. As used herein, a processor may refer to a microprocessor, an application specific integrated circuit (ASIC), a field programmable gate array (FPGA), a digital signal processor (DSP), or other equivalent integrated or discrete logic circuitry. Software may be executed by one or more processors. Software comprising instructions to execute the techniques may be initially stored in a computer-readable medium and loaded and executed by a processor.

Accordingly, this disclosure also contemplates computer-readable storage media comprising instructions to cause a processor (or other computing device) to perform any the techniques described in this disclosure. In some cases, the computer-readable storage medium may form part of a computer program storage product, which may be sold to manufacturers and/or used in a device. The computer program product may include the computer-readable medium, and in some cases, may also include packaging materials.

In one example, this disclosure describes a computer-readable storage medium that stores instructions that, when executed, cause a computing device to divide a leaf-level unit of video data into a plurality of transform coefficient sub-sets, and generate, for a sub-set of the plurality of transform coefficient sub-sets, a syntax element that indicates whether or not the sub-set of includes any non-zero coefficients.

In another example, this disclosure describes a computer-readable storage medium that stores instructions that, when executed, cause a computing device to divide a leaf-level unit of video data into a plurality of transform coefficient sub-sets, determine, a sub-set of the plurality of transform coefficient sub-sets, whether the sub-set includes an associated syntax element that indicates whether or not the sub-set includes any non-zero coefficients, and determine, based on the syntax element, whether or not to decode the sub-set.

The details of one or more examples are set forth in the accompanying drawings and the description below. Other features, objects, and advantages of the invention will be apparent from the description and drawings, and from the claims.

DETAILED DESCRIPTION

Figure 1:
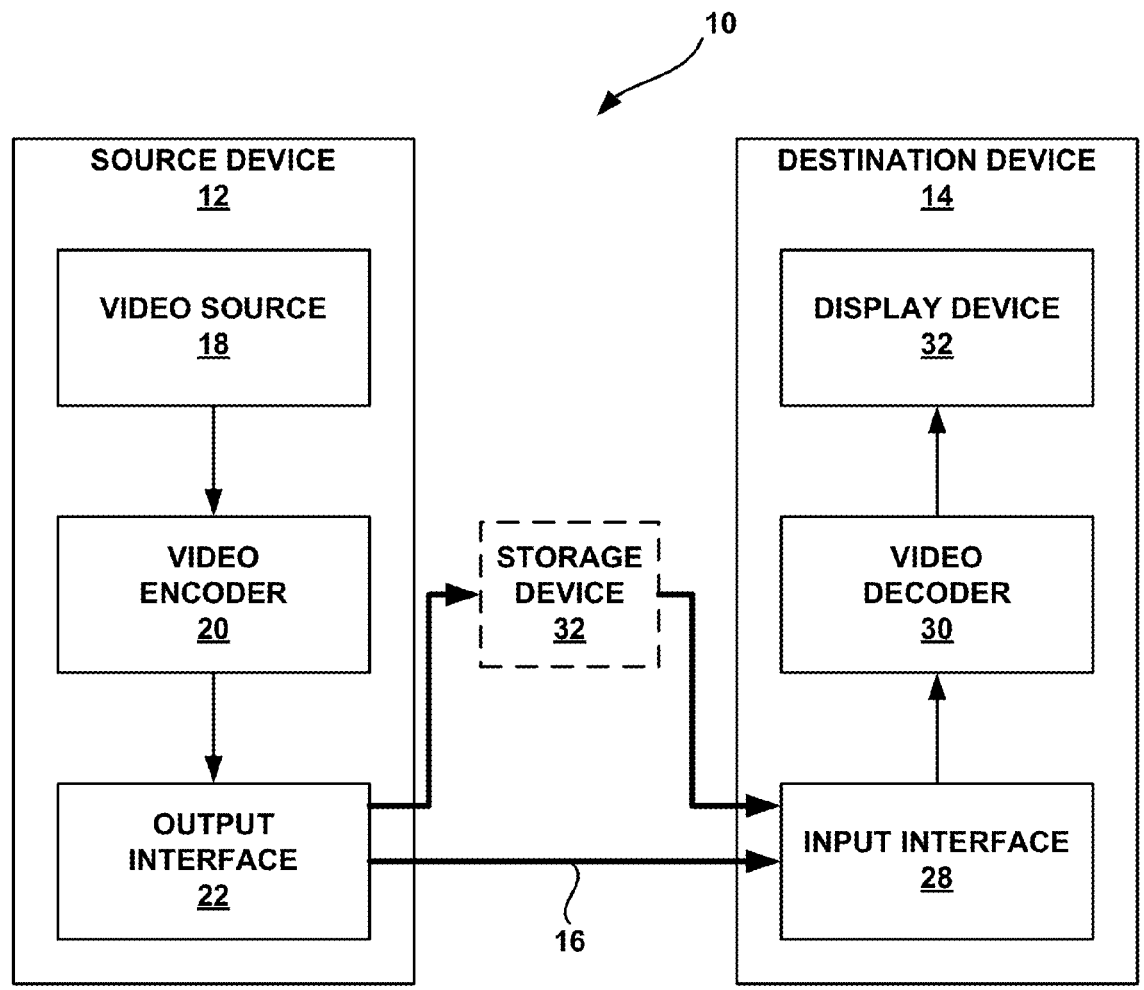
FIG. 1 is a block diagram that illustrates one example of a video encoding and decoding system configured to operate according to the techniques of this disclosure.

FIG. 1 is a block diagram illustrating an example video encoding and decoding system 10 that may utilize the techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Alternatively, encoded data may be output from output interface 22 to a storage device 32. Similarly, encoded data may be accessed from storage device 32 by input interface 28. Storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 32 may correspond to a file server or another intermediate storage device that may hold the encoded video generated by source device 12. Destination device 14 may access stored video data from storage device 32 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 32 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 32 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 32, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. A treeblock has a similar purpose as a macroblock of the H.264 standard. A slice includes a number of consecutive treeblocks in coding order. A video frame or picture may be partitioned into one or more slices. Each treeblock may be split into coding units (CUs) according to a quadtree. For example, a treeblock, as a root node of the quadtree, may be split into four child nodes, and each child node may in turn be a parent node and be split into another four child nodes. A final, unsplit child node, as a leaf node of the quadtree, comprises a coding node, i.e., a coded video block. Such a final, unsplit child node of a video data structure is referred to as a leaf-level unit herein. Syntax data associated with a coded bitstream may define a maximum number of times a treeblock may be split, and may also define a minimum size of the coding nodes.

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Such a leaf node TU is one example of a leaf-level unit as described herein. Pixel difference values associated with the TUs may be transformed to produce transform coefficients, which may be quantized.

In general, a PU includes data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

In general, a TU is used for the transform and quantization processes. A given CU having one or more PUs may also include one or more transform units (TUs). Following prediction, video encoder 20 may calculate residual values corresponding to the PU. The residual values comprise pixel difference values that may be transformed into transform coefficients, quantized, and scanned using the TUs to produce serialized transform coefficients for entropy coding. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

In accordance with this disclosure, video encoder 20 of source device 12 may scan transform coefficients of a leaf-level unit of video data (e.g., a leaf node of a quadtree or other data structure) that includes a two-dimensional matrix of transform coefficients (e.g., that each correspond to pixels of a displayed image) into a one-dimensional vector that represents the transform coefficients. According to the techniques described herein, when performing such a scan, video encoder 20 may divide the leaf-level unit of video data into a plurality of transform coefficient sub-sets. For each of the sub-sets of the leaf-level unit, encoder 20 may determine whether or not to signal, to a decoder as part of an entropy encoded bit stream, a syntax element that indicates whether or not the sub-set includes any non-zero coefficients. Encoder 20 may determine whether or not to signal the syntax element for a particular sub-set based on determining whether or not signaling the syntax element will improve coding efficiency. To determine whether signaling the syntax element will improve coding efficiency, encoder 20 may apply one or more rules, as described in further detail below. Encoder 20 may output an entropy encoded bit stream that includes the block of video data. The entropy encoded bit stream may then be read and decoded by a decoder, to reconstruct the two-dimensional matrix that represents the leaf-level unit of video data.

Reciprocal transform coefficient decoding may also be performed by video decoder 30 of destination device 14. That is, video decoder 30 may map coefficients of a one-dimensional vector of transform coefficients that represent a block of video data to positions within a two-dimensional matrix of transform coefficients, to reconstruct the two-dimensional matrix of transform coefficients. According to the techniques described herein, decoder 30 may read a one-dimensional matrix that represents a leaf-level unit of video data, and divide the leaf-level unit into a plurality of transform coefficient sub-sets. For each of the sub-sets, the decoder 30 may determine whether or not to decode transform coefficients of the sub-set. For example, if the decoder 30 does not read, in the entropy encoded bit stream, a syntax element that indicates whether or not a particular sub-set has non-zero coefficients, then the decoder 30 decodes the coefficients of the sub-set. However, if the decoder 30 does read such syntax element associated with a particular sub-set, the decoder 30 may determine whether or not to decode the transform coefficients of the sub-set based on the value of the syntax element. For example, if the syntax element indicates that the sub-set does include non-zero coefficients, decoder 30 decodes the transform coefficients of the sub-set. However, if the syntax element indicates that the sub-set does not include any non-zero coefficients, decoder 30 does not decode the transform coefficients of the sub-set.

The techniques described herein may improve an efficiency of video coding. For example, dividing a block of video data into a plurality of transform coefficient sub-sets, and signaling syntax elements that indicate whether or not the sub-sets include non-zero coefficients as described herein may reduce a number of bits needed to represent video data, which may improve a level of efficiency of the encoder/decoder.

Figure 2:
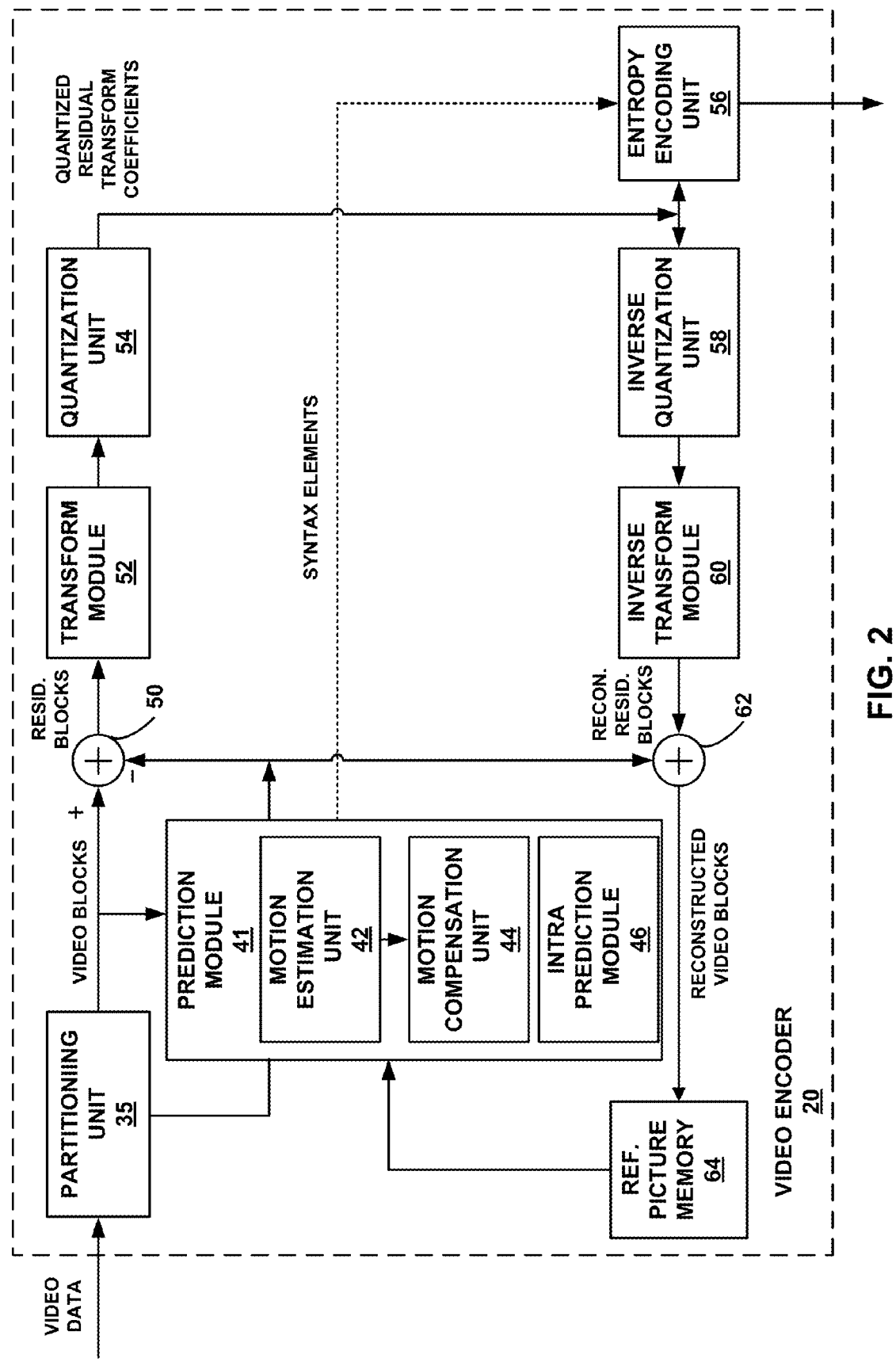
FIG. 2 is a block diagram that illustrates one example of a video encoder configured to operate according to the techniques of this disclosure.

FIG. 2 is a block diagram illustrating an example video encoder 20 that may implement the inter-prediction techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 2, video encoder 20 includes a partitioning unit 35, prediction module 41, reference picture memory 64, summer 50, transform module 52, quantization unit 54, and entropy encoding unit 56. Prediction module 41 includes motion estimation unit 42, motion compensation unit 44, and intra prediction module 46. For video block reconstruction, video encoder 20 also includes inverse quantization unit 58, inverse transform module 60, and summer 62. A deblocking filter (not shown in FIG. 2) may also be included to filter block boundaries to remove blockiness artifacts from reconstructed video. If desired, the deblocking filter would typically filter the output of summer 62. Additional loop filters (in loop or post loop) may also be used in addition to the deblocking filter.

As shown in FIG. 2, video encoder 20 receives video data, and partitioning unit 35 partitions the data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction module 41 may select one of a plurality of possible coding modes, such as one of a plurality of intra coding modes or one of a plurality of inter coding modes, for the current video block based on error results (e.g., coding rate and the level of distortion). Prediction module 41 may provide the resulting intra- or inter-coded block to summer 50 to generate residual block data and to summer 62 to reconstruct the encoded block for use as a reference picture.

Intra prediction module 46 within prediction module 41 may perform intra-predictive coding of the current video block relative to one or more neighboring blocks in the same frame or slice as the current block to be coded to provide spatial compression. Motion estimation unit 42 and motion compensation unit 44 within prediction module 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

After motion compensation unit 44 generates the predictive block for the current video block, video encoder 20 forms a residual video block by subtracting the predictive block from the current video block. The residual video data in the residual block may be included in one or more TUs and applied to transform module 52. Transform module 52 transforms the residual video data into residual transform coefficients using a transform, such as a discrete cosine transform (DCT) or a conceptually similar transform. Transform module 52 may convert the residual video data from a pixel domain to a transform domain, such as a frequency domain.

Transform module 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded. In some examples, entropy encoding unit 56 may then perform a scan of the matrix including the quantized transform coefficients to generate a one-dimensional vector of transform coefficients of an entropy encoded bit stream.

According to the techniques of this disclosure, when scanning a matrix of transform coefficients to generate a one-dimensional vector, entropy encoding unit 56 may divide a leaf-level unit of video data, such as an un-split child node of a quadtree structure as described above, into a plurality of transform coefficients sub-sets that are smaller than the leaf-level unit. For example, entropy encoding unit 56 may divide the leaf-level unit of video data into a plurality of sub-sets that each comprise a geometrical shape within the leaf-level unit. In some examples, entropy encoding unit 56 may divide the transform coefficients of the leaf-level unit into smaller rectangular shaped arrangements of video data. In other examples, entropy encoding unit 56 may divide the transform coefficients of the leaf-level unit into triangular shaped sub-sets of transform coefficients. In still other examples, entropy encoding unit 56 may divide the transform coefficients of the leaf-level unit into sub-sets having other shapes, or even sub-sets that do not correspond to any particular a geometric shape. Instead, entropy encoding unit 56 may divide the plurality of transform coefficients of the leaf-level unit according to a scan order of the transform coefficients, which may be fixed or adaptive. For example, entropy encoding unit 56 may divide the plurality of transform coefficients of the leaf-level units into a plurality of sub-sets of transform coefficients, based on a scan order (e.g., an adaptive or fixed scan order) of the transform coefficients. The sub-sets may have similar or different numbers of coefficients in different examples.

According to the techniques described herein, once the leaf-level unit of transform coefficients has been divided into a plurality of sub-sets, entropy encoding unit 56 may generate, for at least some of the plurality of sub-sets, a syntax element that indicates whether the respective sub-set includes any non-zero coefficients. In some examples, entropy encoding unit 56 may generate such a syntax element for each sub-set of the plurality of sub-sets of transform coefficients. In other examples, entropy encoding unit 56 may selectively determine whether or not to generate such a syntax element, for each sub-set of the plurality of sub-sets. The decision whether or not to generate such a syntax element may be based on whether such signaling provides for additional compression or improved coding efficiency. If so, the syntax element may be generated, but if not, both encoder 20 and decoder 30 may be programmed to know that the indication is not signaled in that instance.

According to the techniques of this disclosure, to determine whether or not generating such a syntax element will improve compression or coding efficiency, entropy encoding unit 56 may apply one or more rules, as described in further detail below. As one example, entropy encoding unit 56 may determine whether to generate the syntax element for a particular sub-set based on a number of potential non-zero coefficients of the sub-set. For example, entropy encoding unit 56 may determine whether to generate the syntax element based on comparing a number of potential non-zero coefficients of the sub-set to a threshold.

Figure 6:
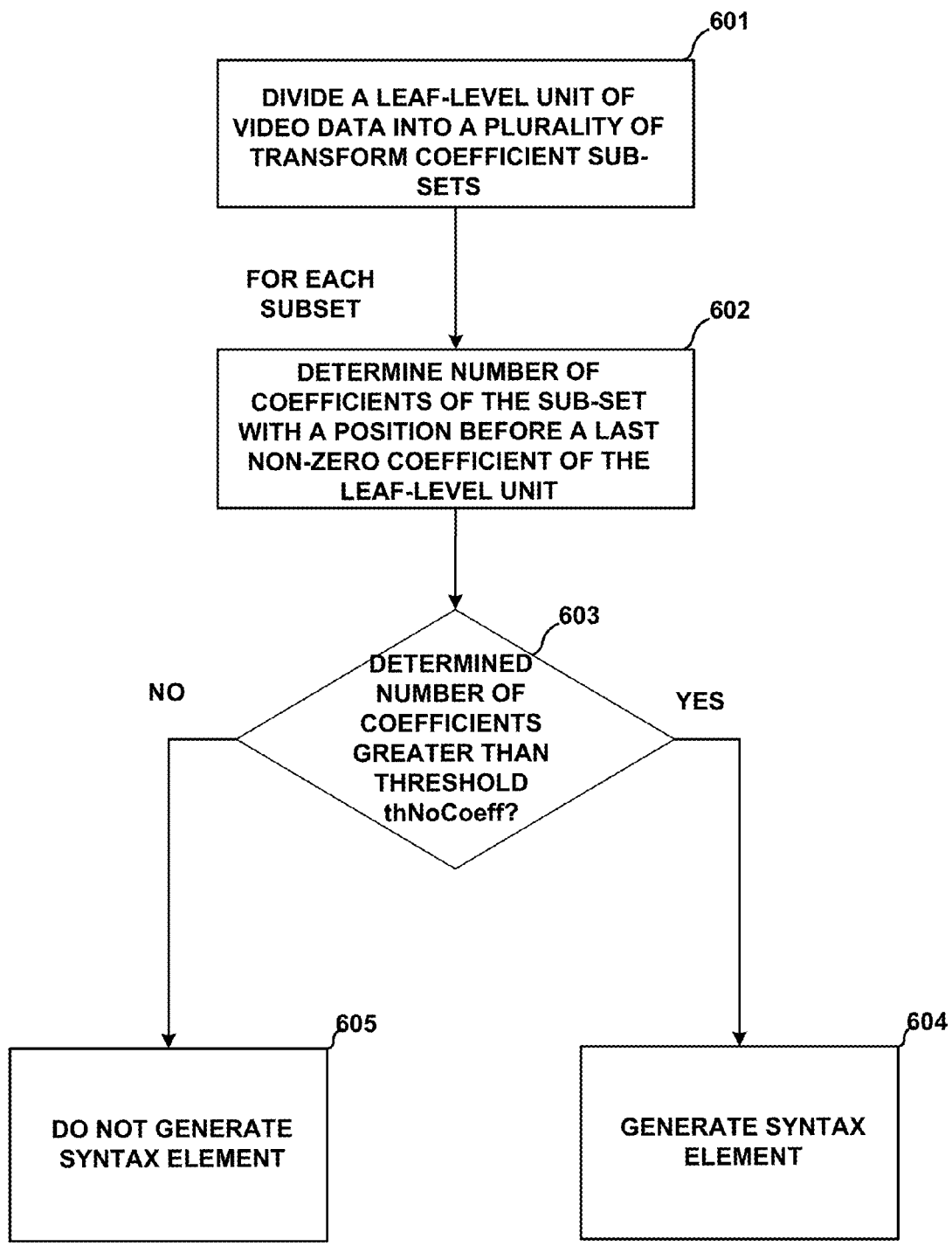
FIG. 6 is a flow diagram that illustrates another example of a method of encoding a leaf-level unit of video data consistent with one or more aspects of this disclosure.

As one example of such a technique, to determine the number of potential non-zero coefficients of a sub-set, entropy encoding unit 56 determines a number of coefficients of the sub-set that have an earlier position than a last non-zero coefficient of the leaf-level unit, and compare the determined number of coefficients to a threshold thNoCoeff, as shown in the example of FIG. 6 and described in further detail below. According to this example, if the determined number of potential non-zero coefficients is greater than the threshold thNoCoeff, entropy encoding unit 56 generates a syntax element that indicates whether or not the sub-set includes any non-zero coefficients. However, if the determined number of potential non-zero coefficients is less than or equal to the threshold thNoCoeff, entropy encoding unit 56 may not generate the syntax element. As one example, entropy encoding unit 56 determines whether to signal a syntax element that indicates whether a particular sub-set includes any non-zero coefficients based on the pseudo code of Example 1 below:

Example 1 noCoeff[xS] [yS]>thNoCoeff
where noCoeff[xS] [yS] indicates a number of potential non-zero coefficients of a subset, and thNoCoeff is a threshold value.

In other examples, entropy encoding unit 56 may determine whether or not to signal the syntax element that indicates whether a sub-set of transform coefficients includes any non-zero coefficients based on other rules. For example, entropy encoding unit 56 may determine whether or not to signal the syntax element for a sub-set based on an average number of non-zero coefficients of the sub-set, as described in further detail below with respect to the example of FIG. 7. According to this example, as leaf-level units of video data are being coded, entropy encoding unit 56 may collect and store statistics that indicate how often coefficients at positions within each sub-set are non-zero. Based on such stored statistics, entropy encoding unit 56 may determine whether or not to generate the syntax element. For example, entropy encoding unit 56 may compare an average number of non-zero coefficients for a sub-set to a threshold thAvrgCoeff. If the average number of non-zero coefficients of the sub-set is less than the threshold, entropy encoding unit 56 generates the syntax element. However, if the average number of non-zero coefficients of the sub-set is greater than or equal to the threshold thAvrgCoeff, entropy encoding unit 56 does not generate the syntax element based on the assumption that in this case it is very likely the sub-set contains at least one non-zero coefficient.

As another example, for a sub-set that contains the last non-zero coefficient (relative to a zig-zag scan, a first non-zero coefficient of an inverse zig-zag scan) of leaf-level unit, the fact that that sub-set contains the last non-zero coefficient means that that subset must include at least one non-zero coefficient, and therefore, it can be assumed that any sub-set that includes the last non-zero coefficient must include at least one non-zero coefficient. Accordingly, there is no need to generate the syntax element for a sub-set that includes the last non-zero coefficient, since this subset can be assumed to include at least one non-zero coefficient.

As one example, entropy encoding unit 56 may determine whether to signal a syntax element that indicates whether a particular sub-set includes any non-zero coefficients based on the pseudo code of Example 2 below:

Example 2

(noCodedCoeff[xS] [yS]+noSubBlks[xS][yS]/2)/noSubBlks<thAvrgCoeff
Here noCodedCoeff[xS] [yS] indicates the number of non-zero coefficients in a sub-set.
According to the pseudo code of Example 1, entropy encoding unit 56 initializes values in the variable array noCoeff[xS][yS] to 0 before encoding a leaf-level unit of video data block and assigning values to the array based on a value of a lastPos syntax element, which indicates a last non-zero coefficient position within a leaf-level unit of video data:

```
for (pos=0; pos<= lastPos; pos++) {
    xC= ScanOrder [0][pos];
    yC= ScanOrder [1][pos];
    noCoeff[xC/M] [yC/M]++;
}
```

According to the pseudo code of Example 2, after the leaf-level unit is encoded, entropy encoding unit 56 may update the variable arrays noSubBlks and noCodedCoeff as follows:

```
for (pos=0; pos<= lastPos; pos++){
    xC= ScanOrder [0][pos];
    yC= ScanOrder [1][pos];
    if (transCoeffLevel[xC][yC] != 0){
        noCodedCoeff[xC/M][yC/M]++;
    }
}
for (xS=0; xS<N/M; xS++){
    for (yS=0; yS<N/M; yS++){
        if (noCoeff[xS] [yS]>0){
            noSubBlks[xS] [yS]++;
        }
    }
}
```

By using the pseudo code of Example 2 above, entropy encoding unit 56 may determine whether or not to signal a syntax element that indicates whether or not a sub-set of transform coefficients of a leaf-level unit includes any non-zero coefficients, based on an average number of non-zero coefficients of the sub-set for previously encoded leaf-level units of video data.

Inverse quantization unit 58 and inverse transform module 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in reference picture memory 64. The reference block may be used by motion estimation unit 42 and motion compensation unit 44 as a reference block to inter-predict a block in a subsequent video frame or picture.

Figure 3:
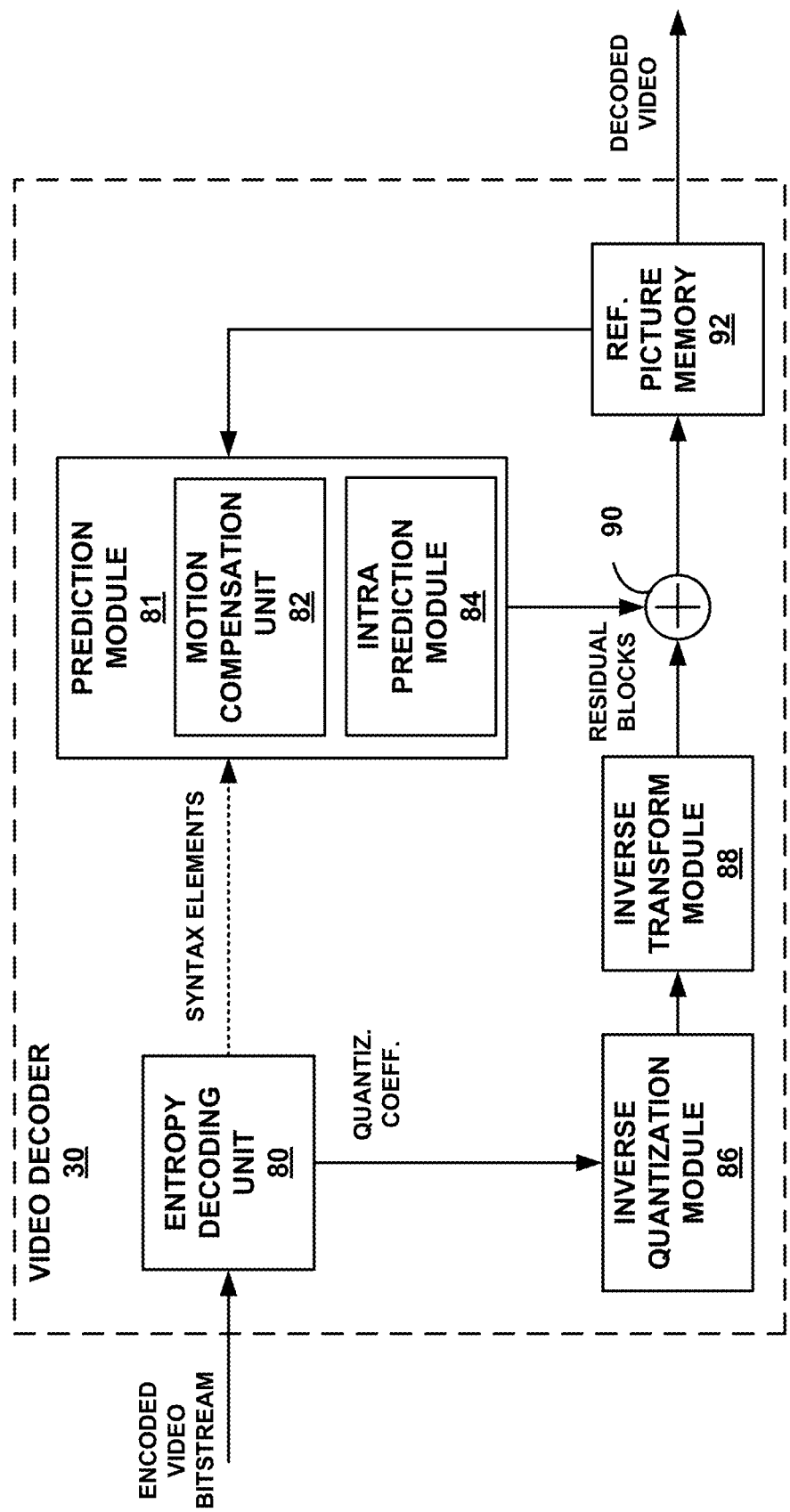
FIG. 3 is a block diagram that illustrates one example of a video decoder configured to operate according to the techniques of this disclosure.

FIG. 3 is a block diagram illustrating an example video decoder 30 that may implement the inter-prediction techniques described in this disclosure. In the example of FIG. 3, video decoder 30 includes an entropy decoding unit 80, prediction module 81, inverse quantization unit 86, inverse transformation unit 88, summer 90, and reference picture memory 92. Prediction module 81 includes motion compensation unit 82 and intra prediction module 84. Video decoder 30 may, in some examples, perform a decoding pass generally reciprocal to the encoding pass described with respect to video encoder 20 from FIG. 2.

During the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized coefficients, motion vectors, and other syntax elements. Entropy decoding unit 80 forwards the motion vectors and other syntax elements to prediction module 81. Video decoder 30 may receive the syntax elements at the video slice level and/or the video block level.

Entropy decoding unit 80 may read a one-dimensional vector of transform coefficients decoded by entropy decoding unit, and reconstruct a two-dimensional matrix of transform coefficients from the one-dimensional vector. According to the techniques described herein, entropy decoding unit 80 may read a one-dimensional matrix that represents a leaf-level unit of video data, and divide the leaf-level unit into a plurality of transform coefficient sub-sets. The transform coefficient sub-sets may have a rectangular, triangular, or any other shape or arrangement. For each of the sub-sets, inverse entropy decoding unit 80 determines whether or not to decode transform coefficients of the sub-set. For example, if entropy decoding unit 80 does not read a syntax element that indicates whether or not a particular sub-set has non-zero coefficients, then inverse quantization unit 86 decodes the coefficients of the sub-set. However, if entropy decoding unit 80 does read such syntax element associated with a particular sub-set, entropy decoding unit 80 may determine whether or not to decode the transform coefficients of the sub-set based on the value of the syntax element. For example, if the syntax element indicates that the sub-set does include non-zero coefficients, entropy decoding unit 80 decodes the transform coefficients of the sub-set. However, if the syntax element indicates that the sub-set does not include any non-zero coefficients, entropy decoding unit 80 does not decode the transform coefficients of the sub-set.

When the video slice is coded as an intra-coded (I) slice, intra prediction module 84 of prediction module 81 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 82 of prediction module 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in reference picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks. Inverse quantization unit 86 inverse quantizes, i.e., de-quantizes, the quantized transform coefficients provided in the bitstream and decoded by entropy decoding unit 80.

In some examples, the inverse quantization process may include use of a quantization parameter calculated by video encoder 20 for each video block in the video slice to determine a degree of quantization and, likewise, a degree of inverse quantization that should be applied. Inverse transform module 88 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, video decoder 30 forms a decoded video block by summing the residual blocks from inverse transform module 88 with the corresponding predictive blocks generated by motion compensation unit 82. Summer 90 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 92, which stores reference pictures used for subsequent motion compensation. Reference picture memory 92 also stores decoded video for later presentation on a display device, such as display device 32 of FIG. 1.

Figure 4:
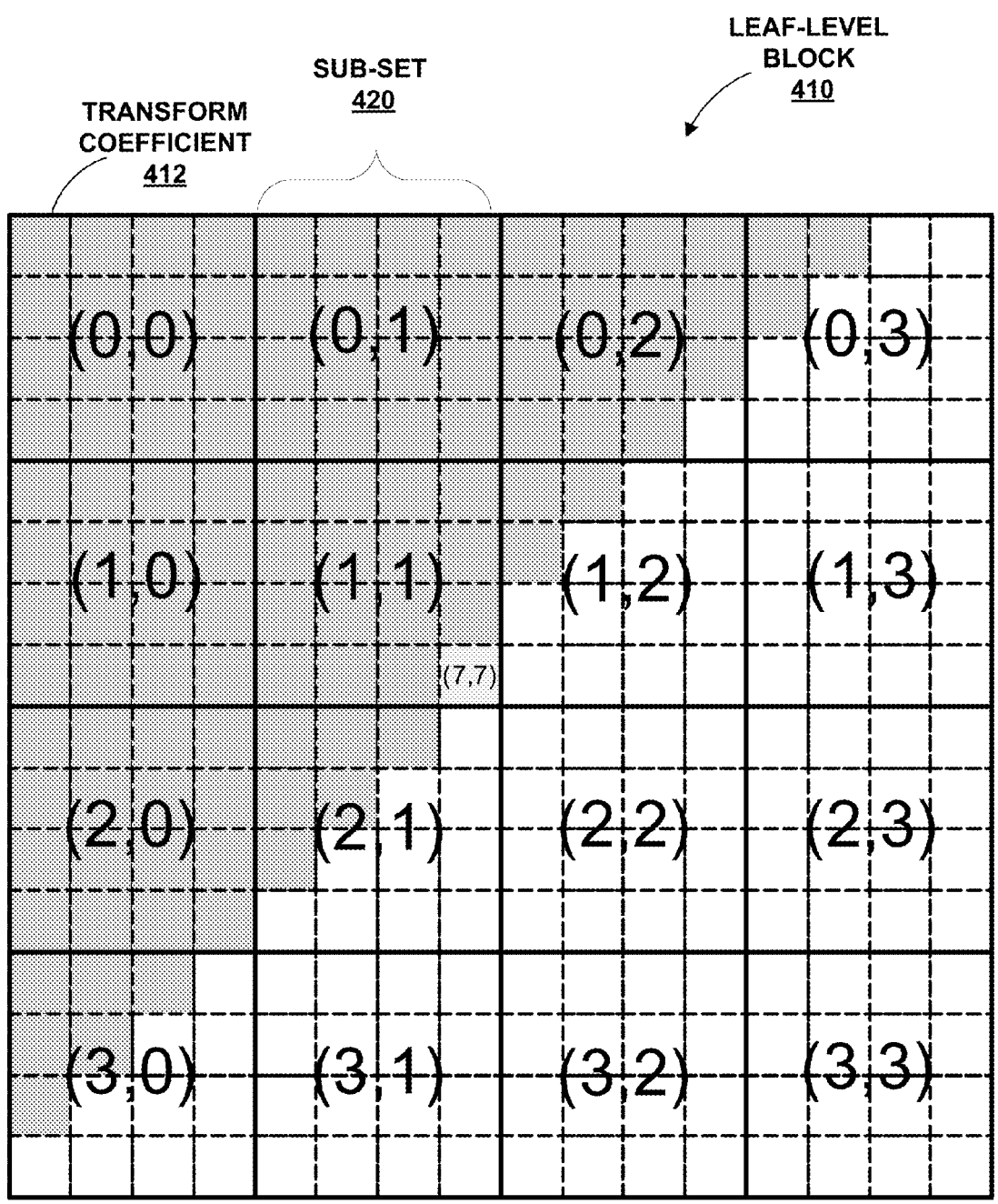
FIG. 4 is a conceptual diagram that illustrates one example of a leaf-level unit of video data divided into a plurality of transform coefficient sub-sets consistent with one or more aspects of this disclosure.

FIG. 4 is a conceptual diagram that depicts one example of a leaf-level unit 410 divided into a plurality of transform coefficient sub-sets consistent with the techniques described herein. Leaf-level unit 410 depicted in FIG. 4 may comprise an un-split child node of video data, e.g., a leaf node of a quadtree (RQT) structure. As shown in FIG. 4, each of the plurality of sub-sets 420 include a plurality of transform coefficients 412 (sixteen transform coefficients in the example of FIG. 1), which may or may not be non-zero coefficients with an amplitude greater than zero. As also shown in FIG. 4, a last non-zero coefficient (relative to a zig-zag scan, a first non-zero coefficient of an inverse zig-zag scan) of leaf-level unit 410 has a position (7, 7) within sub-set (1,1) of leaf-level unit 410.

As described above, once video encoder 20 has divided leaf-level unit 410 into a plurality of transform coefficient sub-sets 420, video encoder 20 may determine whether to generate a syntax element that indicates whether or not the sub-set includes any non-zero coefficients. For example, video encoder 20 may determine whether or not to generate the syntax element associated with a particular block based on a number of potential non-zero coefficients in the block.

According to the example of FIG. 4, a coefficient at position (7, 7) is a last non-zero coefficient of leaf-level unit 420, meaning all of the transform coefficients after position (7, 7) according to a zig-zag scan order (the non-shaded coefficients in the example of FIG. 4) have an amplitude of zero. According to one example, video encoder 20 may determine a number of potential non-zero coefficients in a sub-set based on a last non-zero coefficient position within leaf-level unit 410.

Video encoder 20 may, for each of respective sub-set of leaf-level unit 410 determine the potential number of non-zero coefficients (e.g., coefficients of the inverse zig-zag scan that follow the last non-zero coefficient of the scan at location (7, 7) of the sub-set). For example, video encoder 20 may determine that all sixteen coefficients of each of sub-sets (0, 0), (0, 1), (1, 0), (1, 1) and (2, 0) depicted in FIG. 4 are potentially non-zero coefficients, because all the coefficients of the sub-sets are before the last non-zero coefficient in the scan. Video encoder may also determine that fifteen coefficients of sub-set (0, 2) may potentially be non-zero coefficients, six coefficients of each of sub-sets (2, 1) and (3, 0) may potentially be non-zero coefficients, and three coefficients of sub-sets (1, 1) and (0, 3) may potentially be non-zero coefficients.

Encoder 20 may determine whether to generate a syntax element for the sub-sets 420 depicted in FIG. 4 based on the determined number of potential non-zero coefficients for each sub-set. For example, encoder 20 may compare the determined number of potential non-zero coefficients for each sub-set to a threshold thNoCoeff. If the determined number of potential non-zero coefficients is greater than the threshold, encoder 20 may generate the syntax element that indicates whether or not the sub-set includes non-zero coefficients. However, if the determined number of potential non-zero coefficients is less than or equal to the threshold, encoder 20 may not generate the syntax element.

According to one specific example, the threshold thNoCoeff may have a value of five (5). Referring to the example of FIG. 4, encoder 20 would signal the syntax element that indicates whether or not sub-sets (0, 0), (0, 1), (1, 0), (1, 1), (0, 2), (2, 0), (2, 1), and (3, 0) include non-zero coefficients, because each of these sub-sets 420 include more potential non-zero coefficients than the threshold thNoCoeff value of five. However, for sub-sets (1,2), (0,3), (3,1), (2,2), (1,3), (3,2), (2,3), and (3,3), video encoder 20 would not generate the syntax element, because the sub-sets include less than five potential non-zero coefficients. For example, video encoder 20 may encode the transform coefficients of sub-sets (1,1) and (0, 2) and determine whether the sub-sets include any non-zero coefficients. If video encoder 20 determines that either of sub-sets (1,2) and (0, 3) include any non-zero coefficients, video encoder may generate a syntax element with a value of one (1) associated with the sub-set. Otherwise, if video encoder 20 determines that either of sub-sets (1,1) and (0, 2) do not include any non-zero, video encoder 20 may also generate a syntax element with a value of zero (0) associated with the sub-set. Video encoder 20 may also generate a syntax element with a value of (0) or (1) associated with each of sub-sets (0, 0), (0, 1), (1, 0), (2, 0), (2, 1), and (3, 0).

The syntax elements that indicate whether sub-sets (0, 0), (0, 1), (1, 0), (1, 1), (0, 2), (2, 0), (2, 1), and (3, 0) have non-zero coefficients (e.g., separate syntax elements defined for each respective sub-set) may be output by video encoder 20 as part of an entropy encoded bit stream, and read by decoder 30. As part of reconstructing leaf-level unit 410, decoder 30 may divide data representing unit 410 into a plurality of sub-blocks. For each sub-block, decoder 30 may determine whether the entropy encoded bit stream includes a syntax element that indicates whether the sub-set includes non-zero coefficients. If decoder 30 reads a sub-block that does not include such a syntax element, decoder 30 decodes the coefficients of the sub-set. However, if decoder 30 does read such a syntax element associated with a sub-set, decoder 30 may use the value of the syntax element to determine whether to decode coefficients of the sub-set. For example, according to the example set forth above, if decoder 30 reads a syntax element value of one (1) for sub-set (1,1), decoder may decode the sub-set. However, if decoder 30 reads a syntax element value of zero (0) for sub-set (1,1) decoder 30 does not decode the transform coefficients of the sub-block.

Figure 5:
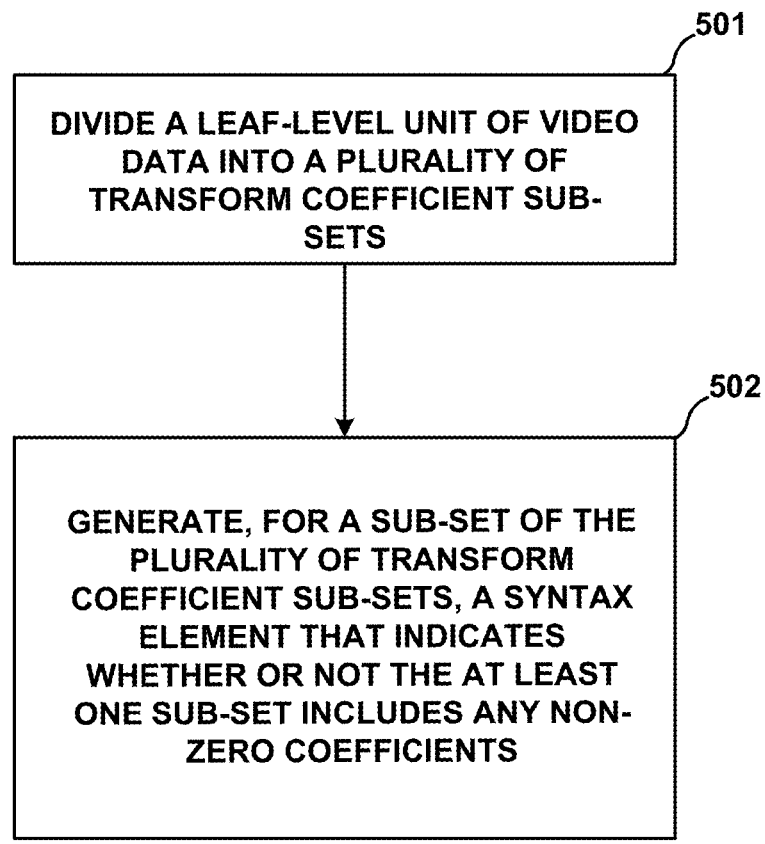
FIG. 5 is a flow diagram that illustrates one example of a method of encoding a leaf-level unit of video data consistent with one or more aspects of this disclosure.

FIG. 5 is a flow diagram that illustrates one example of a method of encoding video data consistent with one or more aspects of this disclosure. The method of FIG. 5 is described as being performed by encoder 20 depicted in FIGS. 1 and 2, however any other device may be used to perform the method of FIG. 5.

As shown in FIG. 5, encoder 20 divides a leaf-block of video data into a plurality of sub-sets that each includes a multiple transform coefficients (501). As one example, the plurality of sub-sets may comprise rectangular shaped sub-sets as depicted in the example of FIG. 4, or any other geometric shape or pattern. The leaf-level unit of video data may comprise a lowest-level coding unit of a video coding standard, such as an un-split child node of a quadtree structure as described above.

As also shown in FIG. 5, encoder 20 generates, for at least one of the plurality of sub-sets, a syntax element that indicates whether or not the sub-set includes non-zero coefficients (502). In some examples, encoder 20 may generate such a syntax element associated with each of the plurality of sub-sets. In other examples, encoder 20 may selectively determine whether or not to generate such a syntax element for each of the sub-sets. For example, encoder 20 may selectively determine whether to generate the syntax element based on whether generating the syntax element will improve coding efficiency and/or compression. The overhead associated with indicating that a particular sub-set actually includes non-zero coefficients may degrade compression in some cases, and in these cases, such overhead signaling can be avoided, and the encoder and decoder may encode/decode the sub-set without any determination of whether or not the sub-set includes non-zero coefficients.

In some examples, encoder 20 may determine whether to generate the syntax element will improve coding efficiency based on a number of potential non-zero coefficients in a sub-set as described in further detail below with respect to FIG. 6, or based on an average number of coefficients of each sub-set as described in further detail below, as described in further detail below with respect to FIG. 7. If encoder 20 generates the syntax element associated with a sub-set, encoder 20 may output the syntax element as part of an entropy encoded bit stream. The entropy encoded bit stream may be read by a decoder 30 as depicted in FIG. 3, and the syntax element may be used by the decoder 30 to decode the leaf-level unit, as described in further detail with respect to FIG. 8 below.

FIG. 6 is a flow diagram that illustrates one example of a method of encoding video data consistent with one or more aspects of this disclosure. The method of FIG. 6 is described as being performed by encoder 20 depicted in FIG. 2, however any device may be used to perform the techniques of FIG. 6. According to the example of FIG. 6, encoder 20 determines whether generating a syntax element associated with a transform coefficient sub-set will improve coding efficiency based on an a number of potential non-zero coefficients for the sub-set.

As shown in the example of FIG. 6, encoder 20 divides a leaf-level unit of video data into a plurality of transform coefficient sub-sets (601). As one example, the plurality of sub-sets may comprise rectangular shaped sub-sets as depicted in the example of FIG. 4, or any other geometric shape or pattern. The leaf-level unit of video data may comprise a lowest-level coding unit of a video coding standard, such as an un-split child node of a quadtree structure as described above.

According to the example, of FIG. 6, video encoder 20 determines whether or not to generate a syntax element associated with each of the plurality of sub-sets based on a number of potential non-zero coefficients of each sub-set. For example, as shown in FIG. 6, encoder 20 determines, for each sub-set, a number of potential non-zero coefficients of the sub-set (602). To determine the number of potential non-zero coefficients, encoder 20 may determine how many coefficients of each sub-set have a position before a last non-zero coefficient of the leaf-level unit, as described above with respect to the example of FIG. 4.

As also shown in FIG. 6, encoder 20 may compare the determined number of potential non-zero coefficients to a threshold value thNoCoeff (603). As also shown in FIG. 6, if the determined number of potential non-zero coefficients is greater than the threshold value thNoCoeff, encoder 20 generates the syntax element associated with the sub-set (604). However, if the determined number of potential non-zero coefficients is less than or equal to the threshold value thNoCoeff, encoder 20 does not generate the syntax element associated with the sub-set (605). According to these examples, if the number of potential non-zero coefficients is less than or equal to the threshold value thNoCoeff, it may be presumed that decoding encoding/decoding the sub-set should be performed. In this manner, the syntax element is not generated for those sub-sets that include very few potential non-zero coefficients, which may reduce a number of bits of information signaled by encoder 20 to represent the leaf-level unit of video data. This is because when a sub-set contains very few potential non-zero coefficients, the number of bits needed for signaling those non-zero coefficients is relatively small, which in turn results in relatively larger overhead in signaling the syntax element that indicates whether or not the sub-set has non-zero coefficients. As a result, it is better not to signal to the syntax element and instead code the coefficients of the sub-set directly when the sub-set contains very few potential non-zero coefficients (i.e., less than thNoCoeff).

Figure 7:
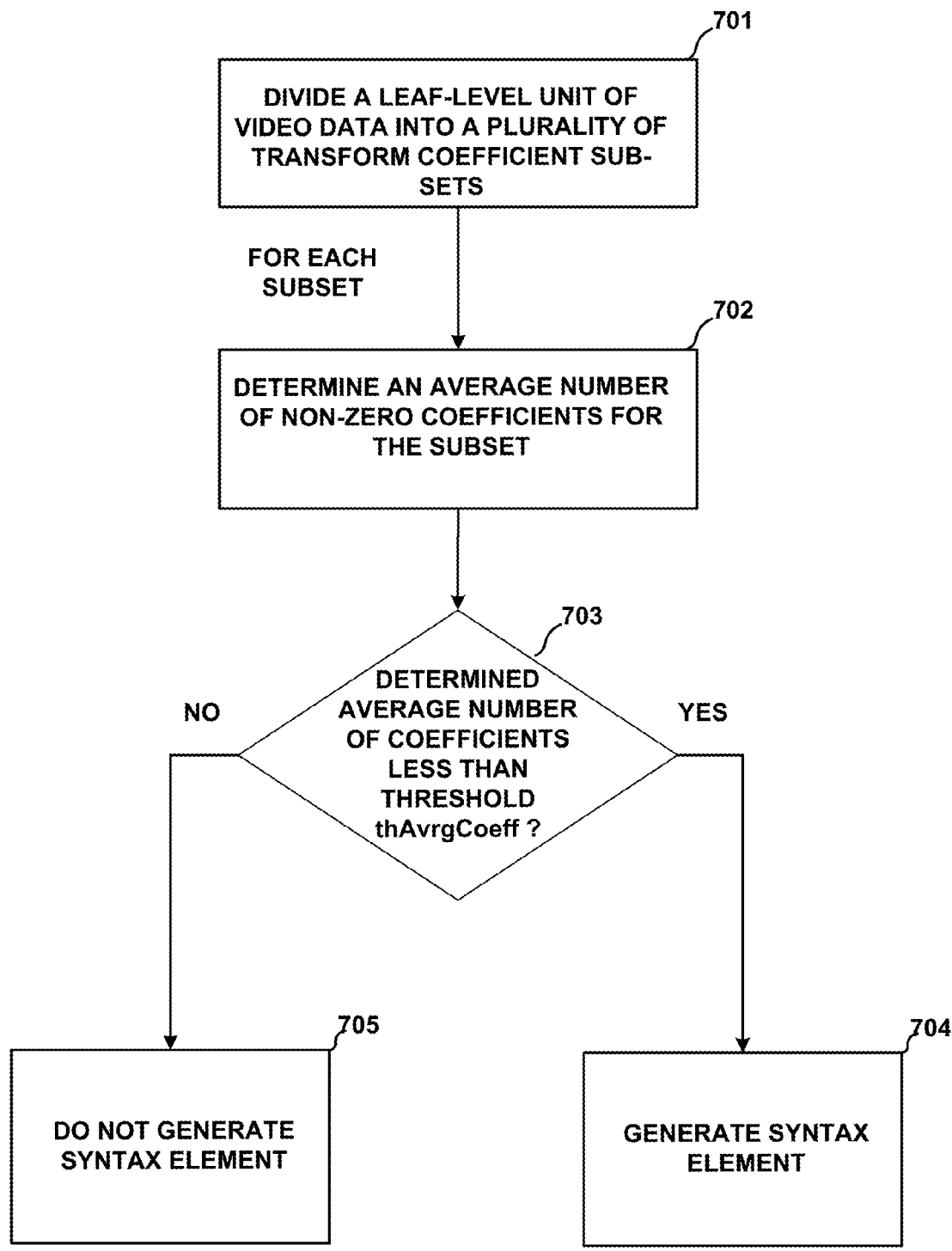
FIG. 7 is a flow diagram that illustrates another example of a method of encoding a leaf-level unit of video data consistent with one or more aspects of this disclosure.

FIG. 7 is a flow diagram that illustrates another example of a method of encoding video data consistent with one or more aspects of this disclosure. The method of FIG. 7 is described as being performed by encoder 20 depicted in FIG. 2, however any device may be used to perform the techniques of FIG. 7. According to the example of FIG. 7, encoder 20 determines whether generating a syntax element will improve coding efficiency based on an average number of non-zero coefficients for each sub-set.

As shown in FIG. 7, encoder 20 divides a leaf-level unit of video data into a plurality of transform coefficient sub-sets (701). As also shown in FIG. 7, for each sub-set, encoder 20 determines an average number of non-zero coefficients for the sub-set. For encoder 20 may be configured to collect statistics that indicate how often coefficients at positions within each sub-set of previously encoded leaf-level units of video data include non-zero coefficients. For example, encoder 20 may maintain one or more counters that count, as leaf-level units are encoded, how often coefficients within each sub-set are non-zero, and/or how many coefficients of each sub-set are non-zero. According to this example, when encoder 20 encodes a new leaf-level unit of video data, encoder 20 may access such a counter to determine the average number of non-zero coefficients for each sub-set. In some examples, the counter for each sub-set may be reset (e.g., initialized) periodically, such as with each video frame or slice.

As also shown in FIG. 7, encoder 20 compares the determined average number of non-zero coefficients to a threshold thAvrgCoeff (703). As also shown in FIG. 7, if the determined average number of non-zero coefficients is less than the threshold thAvrgCoeff, encoder 20 generates the syntax element associated with the sub-set (704). However, if the determined average number of non-zero coefficients is greater than or equal to the threshold, encoder 20 does not generate the syntax element associated with the sub-set (705).

As described above, encoder 20 may generate an entropy encoded bit stream that includes at least one syntax element that indicates whether a sub-set of transform coefficients includes any non-zero coefficients. Encoder 20 may determine whether to generate the syntax element based on a number of potential non-zero coefficients of the sub-set as shown in FIG. 6, or based on an average number of non-zero coefficients, as shown in FIG. 7. A decoder 30 may read the entropy encoded bit stream, including the at least one syntax element, and use the at least one syntax element to decode the entropy encoded bit stream.

Figure 8:
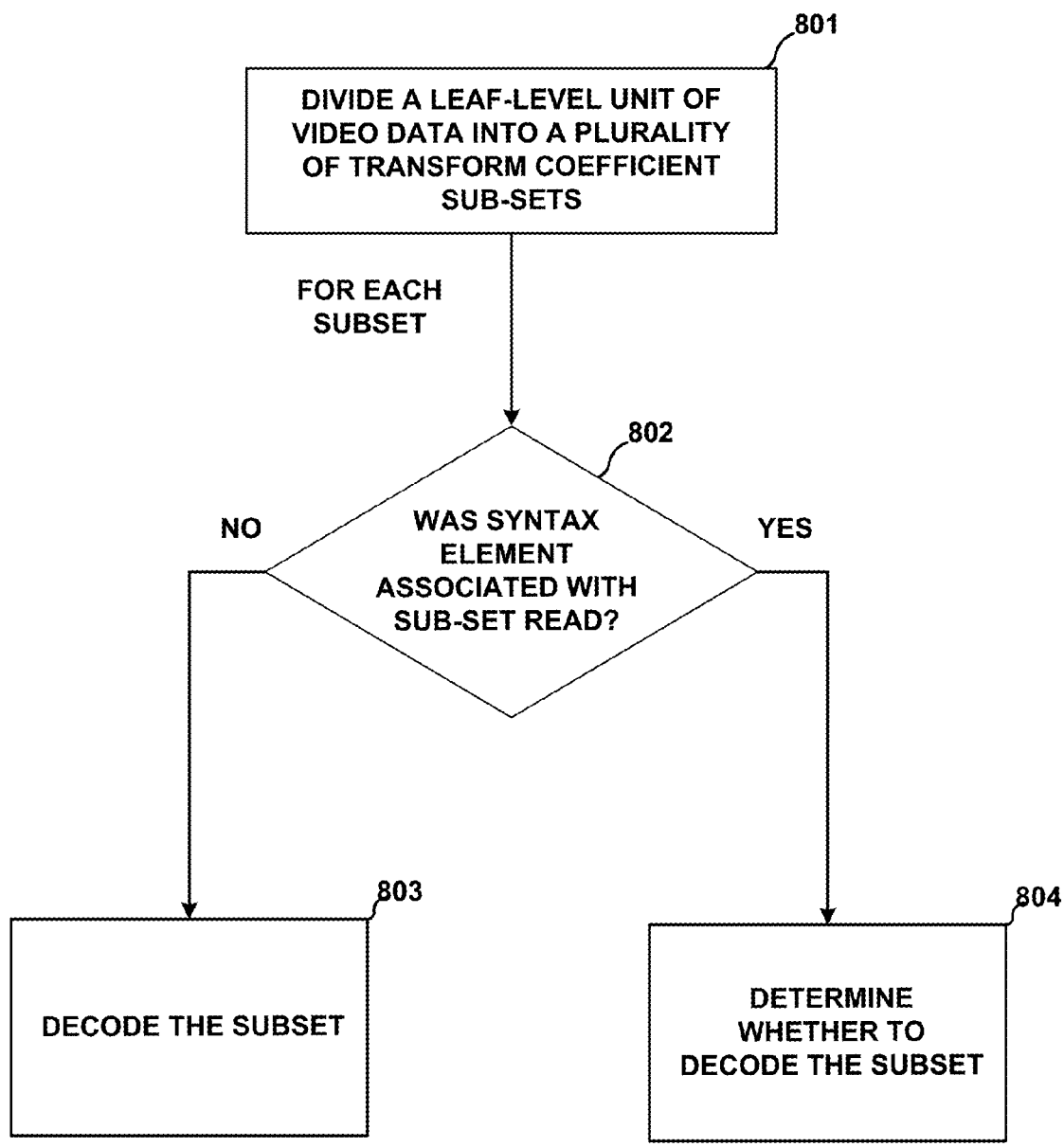
FIG. 8 is a flow diagram that illustrates one example of a method of decoding a leaf-level unit of video data consistent with one or more aspects of this disclosure.

FIG. 8 is a flow diagram that illustrates one example of a method that may be performed by a decoder consistent with one or more aspects of this disclosure. The method of FIG. 8 is described as being performed by decoder 30 depicted in FIG. 3, however any device may be used to perform the method of FIG. 8.

As shown in FIG. 8, decoder 30 may divide a leaf-level unit of video data into a plurality of sub-sets that each includes multiple transform coefficients (801). As one example, the plurality of sub-sets may comprise rectangular shaped sub-sets as depicted in the example of FIG. 4, or any other geometric shape or pattern. The leaf-level unit of video data may comprise a lowest-level coding unit of a video coding standard, such as an un-split child node of a quadtree structure as described above. The leaf-level unit of data is represented by an entropy encoded bit stream that includes at least one syntax element that indicates whether or not a sub-set of the plurality of sub-sets includes any non-zero coefficients.

As also shown in FIG. 8, for each of the sub-sets, decoder 30 determines whether the entropy encoded bit stream includes a syntax element associated with the sub-set (802). As also shown in FIG. 8, if the sub-set does not include such an associated syntax element, decoder 30 decodes the sub-set (e.g., the transform coefficients of the sub-set) (803). As also shown in FIG. 8, if the sub-set does include such an associated syntax element, decoder 30 may use the associated syntax element to determine whether to decode the sub-set (804). For example, if the syntax element has a first value (e.g., a one (1)), decoder 30 decodes the sub-set. However, if the syntax element has a second value (e.g., a zero (0)), decoder 30 does not decode the sub-set.

In one or more examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples been described. These and other examples are within the scope of the following claims.

The invention claimed is:

1. A method of encoding video data, the method comprising:
    dividing a transform block of video data into a plurality of transform coefficient sub-sets;
    determining, for each respective transform coefficient sub-set of the plurality of transform coefficient sub-sets, whether or not to generate a respective syntax element that indicates whether or not the respective transform coefficient sub-set includes any non-zero coefficients, wherein determining whether or not to generate the respective syntax element includes determining not to generate the respective syntax element for the respective transform coefficient sub-set where the respective transform coefficient sub-set includes a last non-zero coefficient of the transform block in a scan order;
    generating the respective syntax element for each of the transform coefficient sub-sets of the plurality of transform coefficient sub-sets for which it was determined to generate the syntax element.

2. The method of claim 1, further comprising:
    determining a number of potential non-zero coefficients, wherein determining whether or not to generate the respective syntax element comprises comparing the number of potential non-zero coefficients of the respective transform coefficient sub-set to at least one threshold; and
    if the number of potential non-zero coefficients of the respective transform coefficient sub-set is greater than the threshold, generating the respective syntax element with a value based on whether or not the respective transform coefficient sub-set includes any non-zero coefficients.

3. The method of claim 2, wherein determining the number of potential non-zero coefficients comprises determining the number of potential non-zero coefficients based on how many coefficients of the respective transform coefficient sub-set have a position after the last non-zero coefficient of the transform block.

4. The method of claim 1, wherein determining whether or not to generate the respective syntax element comprises:
   determining, for a plurality of previously coded transform blocks of video data, an average number of non-zero coefficients included in the respective transform coefficient sub-set;
   comparing the average number of non-zero coefficients included in the respective transform coefficient sub-set to a threshold; and
   if the average number of non-zero coefficients is less than the threshold, generating the respective syntax element with a value based on whether or not the respective transform coefficient sub-set includes any non-zero coefficients.

5. A device configured to encode video data, the device comprising:
   a memory configured to store video data; and
   an integrated circuit configured to:
      divide a transform block of video data into a plurality of transform coefficient sub-sets;
      determine, for each respective transform coefficient sub-set of the plurality of transform coefficient sub-sets, whether or not to generate a respective syntax element that indicates whether or not the respective transform coefficient sub-set includes any non-zero coefficients, wherein, to determine whether or not to generate the respective syntax element, the integrated circuit is configured to determine not to generate the respective syntax element for the respective transform coefficient sub-set where the respective transform coefficient sub-set includes a last non-zero coefficient of the transform block in a scan order;
      generate the respective syntax element for each of the transform coefficient sub-sets of the plurality of transform coefficient sub-sets for which it was determined to generate the syntax element.

6. The device of claim 5, wherein the integrated circuit is further configured to:
   determine a number of potential non-zero coefficients;
   determine whether or not to generate the respective syntax element based on comparing the number of potential non-zero coefficients of the respective transform coefficient sub-set to at least one threshold; and
   if the number of potential non-zero coefficients of the respective transform coefficient sub-set is greater than the threshold, generate the respective syntax element with a value based on whether or not the respective transform coefficient sub-set includes any non-zero coefficients.

7. The device of claim 6, wherein the integrated circuit is configured to determine the number of potential non-zero coefficients based on how many coefficients of the respective transform coefficient sub-set have a position after the last non-zero coefficient of the transform block.

8. The device of claim 5, wherein the integrated circuit is further configured to:
   determine, for a plurality of previously coded transform blocks of video data, an average number of non-zero coefficients included in the respective transform coefficient sub-set;
   compare the average number of non-zero coefficients included in the respective transform coefficient sub-set to a threshold; and
   if the average number of non-zero coefficients is less than the threshold, generate the respective syntax element with a value based on whether or not the respective transform coefficient sub-set includes any non-zero coefficients.

9. A non-transitory computer-readable storage medium that stores instructions that, when executed, cause a computing device to:
   divide a transform block of video data into a plurality of transform coefficient sub-sets;
   determine, for each respective transform coefficient sub-set of the plurality of transform coefficient sub-sets, whether or not to generate a respective syntax element that indicates whether or not the respective transform coefficient sub-set of includes any non-zero coefficients, wherein the instructions that cause the computing device to determine whether or not to generate the respective syntax element comprise instructions that cause the computing device to determine not to generate the respective syntax element for the respective transform coefficient sub-set where the respective transform coefficient sub-set includes a last non-zero coefficient of the transform block in a scan order;
   generate the respective syntax element for each of the transform coefficient sub-sets of the plurality of transform coefficient sub-sets for which it was determined to generate the syntax element.

10. The non-transitory computer-readable storage medium of claim 9, wherein the instructions further cause the computing device to:
    determine a number of potential non-zero coefficients;
    determine whether or not to generate the respective syntax element based on comparing the number of potential non-zero coefficients of the respective transform coefficient sub-set to at least one threshold; and
    if the number of potential non-zero coefficients of the respective transform coefficient sub-set is greater than the threshold, generate the respective syntax element with a value based on whether or not the respective transform coefficient sub-set includes any non-zero coefficients.

11. The non-transitory computer-readable storage medium of claim 10, wherein the instructions further cause the computing device to:
    determine the number of potential non-zero coefficients based on how many coefficients of the respective transform coefficient sub-set have a position after the last non-zero coefficient of the transform block.

12. The non-transitory computer-readable storage medium of claim 9, wherein the instructions further cause the computing device to:
    determine, for a plurality of previously coded transform blocks units of video data, an average number of non-zero coefficients included in the respective transform coefficient sub-set;
    compare the average number of non-zero coefficients included in the respective transform coefficient sub-set to a threshold; and
    if the average number of non-zero coefficients is less than the threshold, generate the respective syntax element with a value based on whether or not the respective transform coefficient sub-set includes any non-zero coefficients.

13. A device configured to encode video data, the device comprising:
  means for dividing a transform block of video data into a plurality of transform coefficient sub-sets;
  means for determining, for each respective transform coefficient sub-set of the plurality of transform coefficient sub-sets, whether or not to generate a respective syntax element that indicates whether or not the respective transform coefficient sub-set includes any non-zero coefficients, wherein the means for determining whether or not to generate the respective syntax element comprise means for determining not to generate the respective syntax element for the respective transform coefficient sub-set where the respective transform coefficient sub-set includes a last non-zero coefficient of the transform block in a scan order;
  means for generating the respective syntax element for each of the transform coefficient sub-sets of the plurality of transform coefficient sub-sets for which it was determined to generate the syntax element.

14. The device of claim 13, further comprising:
  means for determining a number of potential non-zero coefficients;
  means for determining whether or not to generate the respective syntax element based on comparing the number of potential non-zero coefficients of the respective transform coefficient sub-set to at least one threshold; and
  means for, if the number of potential non-zero coefficients of the respective transform coefficient sub-set is greater than the threshold, generating the respective syntax element with a value based on whether or not the respective transform coefficient sub-set includes any non-zero coefficients.

15. The device of claim 14, further comprising:
  means for determining the number of potential non-zero coefficients based on how many coefficients of the respective transform coefficient sub-set have a position after the last non-zero coefficient of the transform block.

16. The device of claim 13, wherein the means for determining whether or not to generate the respective syntax element comprise:
  means for determining, for a plurality of previously coded transform blocks of video data, an average number of non-zero coefficients included in the respective transform coefficient sub-set;
  means for comparing the average number of non-zero coefficients included in the respective transform coefficient sub-set to a threshold; and
  means for, if the average number of non-zero coefficients is less than the threshold, generating the respective syntax element with a value based on whether or not the sub-set includes any non-zero coefficients.

17. A method of decoding video data, the method comprising:
  receiving an encoded video bitstream including syntax elements for a transform block of video data;
  dividing the transform block of video data into a plurality of transform coefficient sub-sets;
  determining, for each respective transform coefficient sub-set of the plurality of transform coefficient sub-sets, whether the syntax elements included in the encoded video bitstream include a respective syntax element that indicates whether or not the respective transform coefficient sub-set includes any non-zero coefficients; and
  determining, for each respective transform coefficient sub-set, whether or not to decode the respective transform coefficient sub-set based on the respective syntax element, wherein determining whether or not to decode the respective transform coefficient sub-set includes:
    if the syntax elements included in the encoded video bitstream do not include the respective syntax element for the respective transform coefficient sub-set, determining whether a last non-zero coefficient in a scan order is included in the respective transform coefficient sub-set; and
    decoding the respective transform coefficient sub-set if the last non-zero coefficient is included in the particular transform coefficient sub-set.

18. The method of claim 17, further comprising:
  if the syntax elements included in the encoded video bitstream do not include the respective syntax element for the respective transform coefficient sub-set, decoding the respective transform coefficient sub-set.

19. The method of claim 18, further comprising:
  if the syntax elements included in the encoded video bitstream do include the respective syntax element for the respective transform coefficient sub-set, determining whether to decode the respective transform coefficient sub-set based on the indication.

20. The method of claim 19, further comprising:
  if the respective syntax element for the respective transform coefficient sub-set has a first value, decoding the respective transform coefficient sub-set; and
  if the respective syntax element for the respective transform coefficient sub-set has a second value different than the first value, not decoding the respective transform coefficient sub-set.

21. A device configured to decode video data, the device comprising:
  a memory configured to store a transform block of video data; and
  an integrated circuit configured to:
    receive an encoded video bitstream including syntax elements for the transform block of video data;
    divide the transform block of video data into a plurality of transform coefficient sub-sets;
    determine, for each respective transform coefficient sub-set of the plurality of transform coefficient sub-sets, whether the syntax elements included in the encoded video bitstream include a respective syntax element that indicates whether or not the respective transform coefficient sub-set includes any non-zero coefficients; and
    determine, for each respective transform coefficient sub-set, whether or not to decode the respective transform coefficient sub-set based on the respective syntax element, wherein to determine whether or not to decode the respective transform coefficient sub-set, the integrated circuit is configured to:
      determine, if the syntax elements included in the encoded video bitstream do not include the respective syntax element for the respective transform coefficient sub-set, whether a last non-zero coefficient in a scan order is included in the respective transform coefficient sub-set; and
      decode the respective transform coefficient sub-set if the last non-zero coefficient is included in the particular transform coefficient sub-set.

22. The device of claim 21, wherein the integrated circuit is further configured to:

if the syntax elements included in the encoded video bitstream do not include the respective syntax element for the respective transform coefficient sub-set, decode the for the respective transform coefficient sub-set.

23. The device of claim 22, wherein the integrated circuit is further configured to:
if the syntax elements included in the encoded video bitstream do include the respective syntax element for the respective transform coefficient sub-set, determine whether to decode the respective transform coefficient sub-set based on the indication.

24. The device of claim 23, wherein the integrated circuit is further configured to:
if the respective syntax element for the respective transform coefficient sub-set has a first value, decode the respective transform coefficient sub-set; and
if the respective syntax element for the respective transform coefficient sub-set has a second value different than the first value, not decode the respective transform coefficient sub-set.

25. A non-transitory computer-readable storage medium that stores instructions that, when executed, cause a computing device to:
receive an encoded video bitstream including syntax elements for a transform block of video data;
divide the transform block of video data into a plurality of transform coefficient sub-sets;
determine, for each respective transform coefficient sub-set of the plurality of transform coefficient sub-sets, whether the syntax elements included in the encoded video bitstream include a respective syntax element that indicates whether or not the respective transform coefficient sub-set includes any non-zero coefficients; and
determine, for each respective transform coefficient sub-set, whether or not to decode the respective transform coefficient sub-set based on the respective syntax element, wherein the instructions that cause the computing device to determine whether or not to decode the respective transform coefficient sub-set comprise instructions that cause the computing device to:
determine, if the syntax elements included in the encoded video bitstream do not include the respective syntax element for the respective transform coefficient sub-set, whether a last non-zero coefficient in a scan order is included in the respective transform coefficient sub-set; and
decode the respective transform coefficient sub-set if the last non-zero coefficient is included in the particular transform coefficient sub-set.

26. The non-transitory computer-readable storage medium of claim 25, wherein the instructions further cause the computing device to:
if the syntax elements included in the encoded video bitstream do not include the respective syntax element for the respective transform coefficient sub-set, decode the respective transform coefficient sub-set.

27. The non-transitory computer-readable storage medium of claim 26, wherein the instructions further cause the computing device to:
if the syntax elements included in the encoded video bitstream do include the respective syntax element for the respective transform coefficient sub-set, determine whether to decode the respective transform coefficient sub-set based on the indication.

28. The non-transitory computer-readable storage medium of claim 27, wherein the instructions further cause the computing device to:
if the respective syntax element for the respective transform coefficient has a first value, decode the respective transform coefficient sub-set; and
if the respective syntax element for the respective transform coefficient sub-set has a second value different than the first value, not decode the respective transform coefficient sub-set.

29. A device configured to decode video data, comprising:
means for receiving an encoded video bitstream including syntax elements encoding a transform block of video data;
means for dividing the transform block of video data into a plurality of transform coefficient sub-sets;
means for determining, each respective transform coefficient sub-set of the plurality of transform coefficient sub-sets, whether the syntax elements included in the encoded video bitstream include a respective syntax element that indicates whether or not the respective transform coefficient sub-set includes any non-zero coefficients; and
means for determining, for each respective transform coefficient sub-set, whether or not to decode the respective transform coefficient sub-set based on the respective syntax element wherein the means for determining whether or not to decode the respective transform coefficient sub-set include:
means for determining, if the syntax elements included in the encoded video bitstream do not include the respective syntax element for the respective transform coefficient sub-set, whether a last non-zero coefficient in a scan order is included in the respective transform coefficient sub-set; and
means for decoding the respective transform coefficient sub-set if the last non-zero coefficient is included in the particular transform coefficient sub-set.

30. The device of claim 29, further comprising:
means for, if the syntax elements included in the encoded video bitstream do not include the respective syntax element for the respective transform coefficient sub-set, decoding the respective transform coefficient sub-set.

31. The device of claim 30, further comprising:
means for, if the syntax elements included in the encoded video bitstream do include the syntax element for the respective transform coefficient sub-set, determining whether to decode the respective transform coefficient sub-set based on the indication.

32. The device of claim 31, further comprising:
means for, if the respective syntax element for the respective transform coefficient sub-set has a first value, decoding the respective transform coefficient sub-set; and
means for, if the respective syntax element for the respective transform coefficient sub-set has a second value different than the first value, not decoding the respective transform coefficient sub-set.

33. The method of claim 1, wherein dividing the transform block of video data into the plurality of transform coefficient sub-sets comprises dividing the transform block of video data into a plurality of transform coefficient sub-sets that are rectangular shaped.

34. The device of claim 5, wherein, to divide the transform block of video data into the plurality of transform coefficient sub-sets, the integrated circuit is configured to divide the transform block of video data into a plurality of transform coefficient sub-sets that are rectangular shaped.

35. The non-transitory computer-readable storage medium of claim 9, wherein the instructions that cause the computing device to divide the transform block of video data into the plurality of transform coefficient sub-sets comprise instructions that cause the computing device to divide the transform block of video data into a plurality of transform coefficient sub-sets that are rectangular shaped.

36. The device of claim 13, wherein the means for dividing the transform block of video data into the plurality of transform coefficient sub-sets comprise means for dividing the transform block of video data into a plurality of transform coefficient sub-sets that are rectangular shaped.

37. The method of claim 17, wherein dividing the transform block of video data into the plurality of transform coefficient sub-sets comprises dividing the transform block of video data into a plurality of transform coefficient sub-sets that are rectangular shaped.

38. The device of claim 21, wherein, to divide the transform block of video data into the plurality of transform coefficient sub-sets, the integrated circuit is configured to divide the transform block of video data into a plurality of transform coefficient sub-sets that are rectangular shaped.

39. The non-transitory computer-readable storage medium of claim 25, wherein the instructions that cause the computing device to divide the transform block of video data into the plurality of transform coefficient sub-sets comprise instructions that cause the computing device to divide the transform block of video data into a plurality of transform coefficient sub-sets that are rectangular shaped.

40. The device of claim 29, wherein the means for dividing the transform block of video data into the plurality of transform coefficient sub-sets comprise means for dividing the transform block of video data into a plurality of transform coefficient sub-sets that are rectangular shaped.

41. The device of claim 5, further comprising:
a video capture device configured to capture the video data.

42. The device of claim 21, further comprising:
a network receiver configured to receive the encoded video bitstream that includes the syntax elements for the transform block of video data; and
a display configured to present a picture based on the leaf-level unit of video data.

43. The device of claim 5, wherein the integrated circuit is an application specific integrated circuit (ASIC).

44. The device of claim 21, wherein the integrated circuit is an application specific integrated circuit (ASIC).

45. The method of claim 1, wherein generating the respective syntax element for each of the transform coefficient sub-sets of the plurality of transform coefficient sub-sets for which it was determined to generate the syntax element comprises:
generating the respective syntax element for fewer than all of the transform coefficient sub-sets of the plurality of transform coefficient sub-sets.

46. The method of claim 17, wherein determining, for each respective transform coefficient sub-set of the plurality of transform coefficient sub-sets, whether the syntax elements included in the encoded video bitstream include a respective syntax element that indicates whether or not the respective transform coefficient sub-set includes any non-zero coefficients comprises:
determining that the syntax elements included in the encoded video bitstream include a respective syntax element for fewer than all of the transform coefficient sub-sets.

* * * * *